United States Patent [19]

Lendrum et al.

[11] Patent Number: 5,327,068

[45] Date of Patent: Jul. 5, 1994

[54] BATTERY PROTECTION SYSTEM

[75] Inventors: Robin E. Lendrum, Livonia; Eric R. Hempelmann, Farmington Hills, both of Mich.

[73] Assignee: Peerless Innovations, Inc., Livonia, Mich.

[21] Appl. No.: 907,394

[22] Filed: Jul. 1, 1992

[51] Int. Cl.⁵ .................... H02G 3/00; H02H 7/18; H02J 7/00
[52] U.S. Cl. .................................. 320/13; 307/10.7
[58] Field of Search .................... 320/13; 307/10.7

[56] References Cited

U.S. PATENT DOCUMENTS

| | | | |
|---|---|---|---|
| 3,522,481 | 8/1970 | Terzic | 320/40 X |
| 3,623,131 | 11/1971 | Russell | 307/10.7 |
| 3,646,354 | 2/1972 | Von Brimer | 307/10.7 |
| 4,132,942 | 1/1979 | Yamamoto | 320/13 |
| 4,137,557 | 1/1979 | Ciarnillo et al. | 307/10.7 X |
| 4,163,135 | 7/1979 | Steen | 200/158 |
| 4,218,717 | 8/1980 | Shuster | 307/10.7 X |
| 4,493,001 | 1/1985 | Sheldrake | 307/10.7 X |
| 4,803,459 | 2/1989 | Ta | 320/48 X |
| 4,902,956 | 2/1990 | Sloan | 320/13 |
| 4,950,913 | 8/1990 | Kephart | 307/10.7 |

Primary Examiner—R. J. Hickey
Attorney, Agent, or Firm—Harness, Dickey & Pierce

[57] ABSTRACT

A battery protection system for an engine-driven system having an engine, a storage battery to provide starting power for the engine, a main switch having a first condition in which the engine is operative and a second condition in which the engine is inoperative, and a load circuit connected to the battery to receive electrical power from the battery. The battery protection system protects the battery from being discharged below a predetermined minimum value sufficient to start the engine.

2 Claims, 1 Drawing Sheet

BATTERY PROTECTION SYSTEM

BACKGROUND OF THE INVENTION

1. Field of the Invention

This invention relates to a system to prevent a storage battery intended to provide starting power for an engine from being excessively discharged by load circuits that remain connected across the battery when the engine is not running. In particular, it relates to a protection system to disconnect load circuits from the storage battery of an engine-driven vehicle when the engine is not running and when current through the load circuits causes the battery to become so discharged as to lower its voltage below the value necessary to restart the engine.

2. The Prior Art

Various systems have been used to prevent a storage battery that provides starting current for a vehicle and load current for lights, horns, radios, and other load circuits from being discharged by the load current to a level below that necessary for the battery to restart the vehicle. Such protection systems have typically operated by disconnecting the load circuits from the battery when the charge in the battery drops below a predetermined value. In some systems, the value of the retained charge is considered to be indicated by the terminal voltage of the battery. However, when the engine is running, it is important that the protection system not interfere with normal operation of the vehicle, such as by disconnecting its lights, even if the retained charge drops below the restart level.

Systems discussed by Rickey in U.S. Pat. No. 3,474,296; Frezzolini et al. in U.S. Pat. No. 3,656,045; Ciarnello et al. in U.S. Pat. Nos. 4,088,940 and 4,137,557; and Sheldrake in U.S. Pat. No. 4,493,001 fail to provide a control switch connected to a protection circuit to keep the protection circuit out of operation when the control switch is closed (corresponding to having the engine running), thus allowing current to reach load circuits as long as the switch is closed, whether or not the battery voltage is high enough to restart the engine.

SUMMARY OF THE INVENTION

It is one object of this invention to provide a protection system to prevent a storage battery that is used to start an engine from being excessively discharged by a charge drained off by a load circuit when the engine is not running, while not interfering with the discharge of the battery, even below a desired level, when the engine is running.

Another object is to provide, in an engine system having a battery to start the engine, a protection system having a protection circuit with means to interrupt a load circuit and actuating means to cause the protection circuit to operate only when the engine is not running.

Yet another object is to provide a protection system for use in a vehicle having an engine and a battery to provide starting power for the engine, wherein the battery voltage is measured and compared with a stable voltage, only when the engine is not running, to stop the continued supply of current from the battery to a load circuit when the comparison indicates that the battery voltage has decreased to a predetermined minimum level sufficient to restart the engine.

In accordance with this invention, a battery protection system is provided for an engine-driven system having an engine, a storage battery to provide starting power for the engine, a main switch having a first condition in which the engine is operative and a second condition in which the engine is inoperative, and a load circuit connected to the battery to receive electrical power from the battery. The battery protection system protects the battery from being discharged below a predetermined minimum value sufficient to start the engine.

the preferred protection system comprises a protection circuit that includes charge-measuring means to measure a value functionally related to the charge remaining in the battery, and controllable switching means connected in series with the load circuit. The system further includes actuating means connected to the protection circuit and to the main switch to place the protection circuit in its operating condition, when the main switch is in its second condition, to disconnect the load circuit from the battery when the value functionally related to the charge remaining in the battery decreases below a predetermined value sufficient to start the engine.

Still further objects will become apparent from the following description and the accompanying drawing.

DETAILED DESCRIPTION OF A PREFERRED EMBODIMENT

Figure 1:
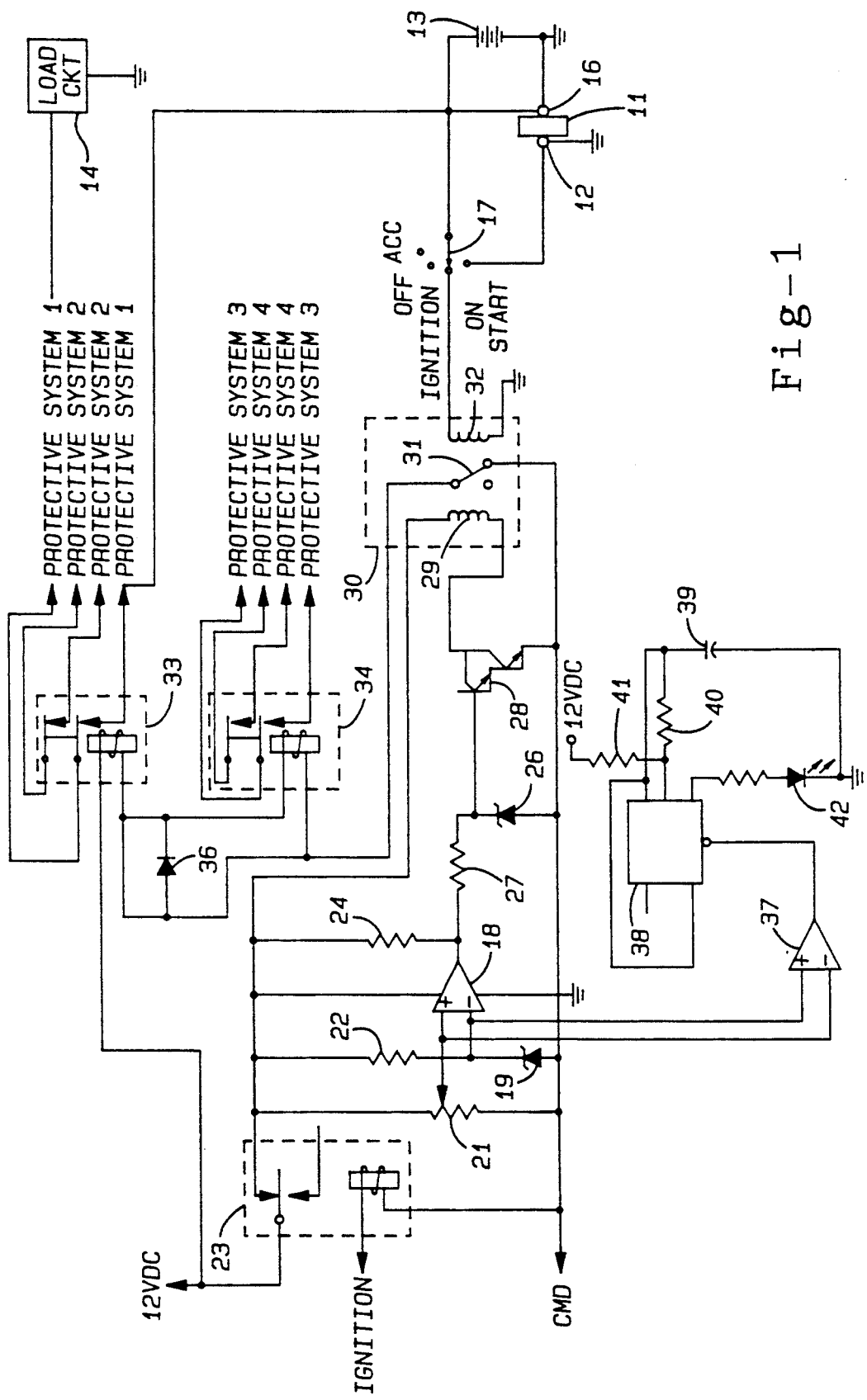
FIG. 1 is a schematic circuit diagram of a protection system in accordance with this invention.

The drawing shows an engine 11 and an electric starter 12 attached to it. The engine may be used in automobiles and other road vehicles, in boats and other off-road uses. A storage battery 13 supplies the electric current needed to operate the starter and to supply current to other circuits, such as the ignition circuit, if the engine has one, and to load circuits, indicated by reference numeral 14. Such load circuits may be any electrical devices used on or in conjunction with the vehicle, such as headlights, parking lights, courtesy lights, radio, etc.

The engine also has means 16 to generate a charging current when engine 11 is running. A device typically used for that purpose is an alternator. That term will be used in this description when reference is made to means 16, although there are other charging means besides alternators. The alternator is used to supply current to maintain a sufficient charge in the battery to make it possible to restart the engine from a non-running condition. The circuit in the drawing indicates that one terminal of battery 13 is connected to starter 12 through main switching means 17, illustrated here as a four-position ignition switch of the type commonly used in automobiles. The switch consists of an arm and four switch terminals labeled START, ON, OFF and ACC with a contact in each position, although other switching arrangements are frequently used. A main switch having only an ON and an OFF position could be used.

In the switch shown, the arm is placed momentarily on the START contact to cause starting current to be supplied to starter 12. As is well known, starter circuits are more complex than the one shown in the drawing and normally include a solenoid connected to the START contact, and have solenoid contacts capable of handling the high starting current when the arm of switch 17 is placed on the START contact. When engine 11 starts, the arm of switch 17 is placed on the ON terminal, where it normally remains until the operator decides to turn off the engine by moving the arm to the OFF position. The fourth position allows certain accessories, such as the radio, to be connected to the battery when the engine is not running.

When switch 17 is not in the ON position, the engine will not be running, and alternator 16 will not be generating current. Normally, no current will be drawn from the battery, or at most, only the very small current required to run a clock and any computing apparatus that must remain in standby operation. However, there are occasions when load circuits may accidentally be left in operation or may operate as the result of some failure, such as having electrical insulation worn off a wire. In that case, current of significant magnitude may be drawn from the battery, causing the battery to discharge to a level too low to restart the engine. The protection circuit shown in the drawing is arranged to prevent that from happening.

The protection circuit includes means to measure a value, such as the battery voltage, that is functionally related to the charge remaining in battery 13. In order to do so, a comparison circuit comprising a comparator or differential amplifier 18 is used. The comparator has two input terminals, one connected to a stable voltage source, shown in this embodiment as a zener diode 19, and the other connected to the arm of a potentiometer 21. The zener diode is connected in series with a resistor 22. This series circuit is connected in parallel with the potentiometer.

This parallel circuit is not directly connected across the battery. Instead, it is connected between ground and a normally closed terminal of a relay 23 that serves as actuating means. The negative terminal of battery 13 is connected to ground, and the positive terminal is connected to the arm of the relay, so that the potentiometer and the zener diode can only be actuated by the battery when the coil, or operating means, of relay 23 is not energized. The coil is connected between the ON terminal of the switch 17 and ground and will, therefore, receive current from battery 13 only when the arm of the switch is placed on the ON contact. The comparator is also connected to the normally closed contact of relay 23 and will also operate only when no current is flowing through the coil of the relay.

The output terminal of comparator 18 is connected to the normally closed contact of the relay 23 by a resistor 24. Another zener diode 26, in series with another resistor 27, is connected between ground and the output terminal of the comparator. The base input terminal of a Darlington amplifier 28 is connected to the common circuit point between the zener diode 26 and the resistor 27. The emitter of the Darlington amplifier is connected to ground. The output collector terminal of the Darlington amplifier is connected to one end of a SET coil 29 of a latching relay 30. The other end of this SET coil is connected to the normally closed contact of relay 23.

The latching relay 30 has an arm 31 movable between a terminal connected to ground and a floating terminal, and a RESET coil 32 connected in series between ground and the ON terminal of switch 17. The arm 31 is connected to controllable switching means, which, in this embodiment, is two relays 33 and 34 having coils connected directly in parallel with each other between arm 31 and the positive terminal of battery 13. Thus, the operation of relays 33 and 34 does not depend entirely on whether relay 23 is actuated or not.

A damping diode 36 is connected in parallel with the coils of relays 33 and 34 to prevent oscillations when current through the coils is interrupted by movement of arm 31 of the latching relay 30 to the floating terminal. Relay 33 has two arms and two normally open terminals. One of these arms and its terminal are connected as a protective circuit 1 in series between load circuit 14 and battery 13, and the other arm and terminal of that relay forms a second protective circuit 2 to be connected in series between another load circuit (not shown) and the battery. In the same way, relay 34 has contacts that form two more protective circuits 3 and 4 that may be connected to other load circuits (not shown).

It is not necessary that there be four protective circuits; there must be at least one, but there can be as many more as necessary. They all operate at the same time, and may be connected to multiple terminals on a single relay, or may be connected to as many separate relays as may be desired.

The operation of the protection system depends, first, on whether or not the arm of switch 17 is in the ON position, corresponding to having engine 11 running. If the arm is in that position, current from battery 13 will flow through the coil of the actuating relay 23 and will pull the arm away from the contact with which it is normally closed. As a result, the battery will be disconnected from the protective circuit comprising the potentiometer 21, the zener diode 19, the comparator 18, the zener diode 26, and the series circuit consisting of the SET coil 29 and the output circuit of the Darlington amplifier 28. At the same time, the fact that the arm of switch 17 is at the ON contact connects the RESET coil 32 of the latching relay 30 across battery 13. The resulting current through the RESET coil pulls the arm 31 to the contact connected to ground. The arm 31 remains there as long as no current flows through SET coil 29.

With arm 31 connected to ground, the coils of relays 33 and 34 are connected directly across battery 13, causing all of their arms to be pulled against their fixed contacts and closing the protective circuits 1 through 4. While protective circuit 1 is shown as the only circuit between load circuit 14 and the battery, some of the load circuits, such as the radio, would be connected in series not only with one of the protective circuits but with either the ACC terminal or the ON terminal. In any case, it should be understood that the load circuit includes a switch for that particular load.

When the arm of switch 17 is moved to the OFF terminal or the ACC terminal, neither the coil of relay 23 nor the RESET coil 32 of the latching relay 30 is energized. As a result, the protection circuit is energized by way of the contacts of the relay 23, and the RESET coil 32 is no longer energized. If the voltage of the battery is high enough, the voltage at the arm of potentiometer 21 will be higher than the stable voltage across zener diode 19, and the output terminal of the comparator will drop to ground potential, acting as a sink for the base current to the Darlington amplifier causing it to be non-conductive. As a result, no current will flow through SET coil 29 of the latching relay, and arm 31 will remain latched to the grounded terminal. This allows current to continue to flow through the coils of the relays 33 and 34, keeping the protective circuits 1 through 4 closed so that current can flow to the load circuit (and any other load circuits), provided its switch is closed.

If battery 13 becomes discharged through age or any current drain through one or more of the load circuits, the voltage across the battery will decrease. The arm of potentiometer 21 is set so that, when the battery voltage has decreased to a value corresponding to at least enough to restart engine 11, the voltage at the arm will be just low enough to be less than the voltage across zener diode 19, and the output terminal of the comparator will draw no current. As a result, the base voltage of the Darlington amplifier will be determined by the voltage across the zener diode 26, and the Darlington amplifier will conduct, thereby drawing current through SET coil 29 and drawing arm 31 of the latching relay 30 to the floating terminal. This opens the circuit through the coils of relays 33 and 34 and allows the arms of those relays to move away from the normally open contacts, interrupting all of the protective circuits 1 through 4. This prevents current from flowing from the battery to any load circuit and preserves the battery from further discharge. The remaining charge is still great enough to start the engine, at least under normal conditions. The purpose of using zener diode 26 is to prevent the base voltage of the Darlington amplifier from rising high enough to be destructive. Typically, Darlingtons should not have a base-emitter voltage greater than about 6 volts. Without zener diode 26, the base voltage could go to about 11 volts.

The circuit also includes a second comparator 37, having input terminals connected directly in parallel with the input terminals of comparator 18. Comparator 37 is preferably the same as comparator 18. The output terminal of comparator 37 is connected to an actuating terminal of a 555 timer 38, which is connected to timing elements comprising a capacitor 39 and resistors 40 and 41 to oscillate at a low frequency of a few Hertz. Timer 38 has an L.E.D. 42 connected to it to be actuated by the oscillations. At least the L.E.D. is mounted where it can be easily seen.

The purpose of producing visible pulses of light is to call attention to the fact that the voltage of battery 13 has decreased to a value low enough so that any further decrease may make it possible to restart the engine. The timer 38 is free to oscillate when the output terminal of comparator 37 goes high, which happens when the voltage across zener diode 19 exceeds the voltage at the arm of the potentiometer 21.

The invention has been described in terms of a specific embodiment, but it will be understood that modifications may be made therein without departing from the true scope of the invention.

What is claimed is:

1. In an engine-driven system having an engine, a storage battery to provide starting power for the engine, charging means connected to the battery and driven by the engine to provide charging current for the battery when the engine is running, an ignition switch having a first condition in which the engine is operative and a second condition in which the engine is inoperative, and a load circuit connected to the battery to receive electrical power from the battery, a battery protection system to protect the battery from being discharged below a predetermined minimum value sufficient to start the engine, said protection system comprising:

(a) a protection circuit comprising:
  (i) a stable voltage source,
  (ii) a comparator connected to the stable voltage source and to the battery to compare voltage derived from the battery with voltage derived from the stable voltage source,
  (iii) controllable switching means connected in series with the load circuit to disconnect the load circuit from the battery when the battery voltage decreases below a predetermined value,
  (iv) a latchable switching means comprising:
    (1) a fixed contact;
    (2) a movable contact;
    (3) setting means connected to a charge-measuring means to be controlled thereby to move the movable contact into conductive connection with the fixed contact only when the value functionally related to the charge remaining in the battery is below the predetermined value sufficient to start the engine;
    4) resetting means connected to the ignition switch to be energized thereby to move the movable contact out of conductive connection with the fixed contact when the ignition switch is in its first condition; and b) actuating means connected to the protection circuit and to the ignition switch to actuate the protection circuit when the ignition switch is in its second condition, to disconnect the load circuit from the battery when the value functionally related to the charge remaining in the battery decreases below a predetermined value sufficient to start the engine, said actuating means comprising a coil connected in series with the battery and the ignition switch being energized only when the ignition switch is in its first condition, said coil being operatively connected to normally closed contacts conductively connected to each other only when the ignition switch is in its second condition and electrically separated from each other when the ignition switch is in its first condition, the normally closed contacts being connected in series with the battery and the protection circuit to require the protection circuit to operate when the ignition switch is in its second condition and to prevent the protection circuit from operating when the ignition switch is in its first condition.

2. The protection system of claim 1 in which the controllable switching means comprises relay means having a control portion connected in series with the contacts of the latchable switching means and a contact portion connected in series with the load circuit, the contact portion comprising normally open contacts movable to a conductively connected condition when the resetting means is energized.

* * * * *

UNITED STATES PATENT AND TRADEMARK OFFICE
CERTIFICATE OF CORRECTION

PATENT NO. : 5,327,068
DATED : July 5, 1994
INVENTOR(S) : Robin E. Lendrum and Eric R. Hempelmann It is certified that error appears in the above-indentified patent and that said Letters Patent is hereby corrected as shown below:

Column 2, line 10, "the" should be -- The --.

Column 5, line 44, "possible" should be -- impossible --.

Signed and Sealed this

Twentieth Day of September, 1994

*Attest:*

BRUCE LEHMAN

*Attesting Officer*      *Commissioner of Patents and Trademarks*